United States Patent [19]
Quate et al.
[11] Patent Number: 4,745,419
[45] Date of Patent: May 17, 1988

[54] HOT MELT INK ACOUSTIC PRINTING

[75] Inventors: Calvin F. Quate, Stanford; Scott A. Elrod, Menlo Park, both of Calif.
[73] Assignee: Xerox Corporation, Stamford, Conn.

[21] Appl. No.: 57,184
[22] Filed: Jun. 2, 1987
[51] Int. Cl.[4] .......... G01D 15/16
[52] U.S. Cl. .......... 346/140 R
[58] Field of Search .......... 346/140, 1.1

[56] References Cited

U.S. PATENT DOCUMENTS

| | | | |
|---|---|---|---|
| 4,046,073 | 8/1977 | Mitchell | 346/1.1 X |
| 4,308,547 | 12/1981 | Lovelady et al. | 346/140 |
| 4,608,577 | 8/1986 | Hori | 346/140 |
| 4,609,924 | 9/1986 | De Young | 346/1.1 |
| 4,675,694 | 6/1987 | Bupara | 346/1.1 |
| 4,697,195 | 9/1987 | Quate | 346/140 |

OTHER PUBLICATIONS

Krause, K. A., "Focusing Ink Jet Head", IBM Technical Disclosure Bulletin, vol. 16, No. 4, Sep. 1973.
Quate, Calvin F., "The Acoustic Microscope", Scientific American, vol. 241, No. 4, Oct. 1979, pp. 62–70.
Quate, Calvin F., "Acoustic Microscopy", American Institute of Physics, Physics Today, Aug. 1985, pp. 34–42.

*Primary Examiner*—Joseph W. Hartary

[57] ABSTRACT

To facilitate the use of hot melt inks in acoustic ink printers of the type having a printhead including one or more acoustic droplet ejectors for supplying focused acoustic beams, such a printer comprises a carrier for transporting a generally uniformly thick film of hot melt ink across its printhead, together with a heating means for liquefying the ink as it nears the printhead. The droplet ejector or ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating.

10 Claims, 3 Drawing Sheets

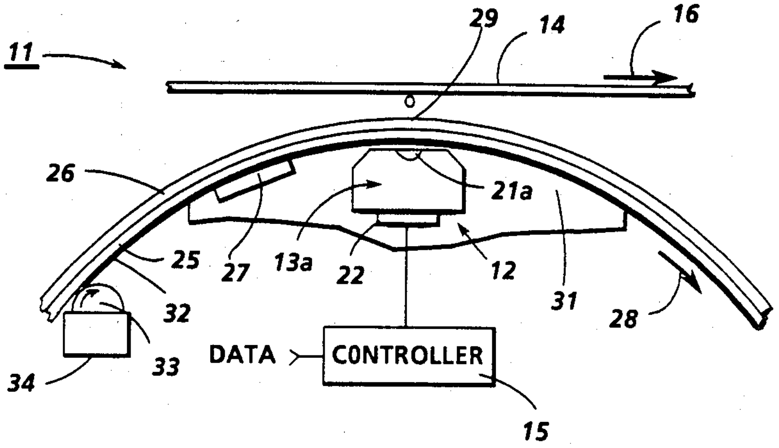
FIG. 1
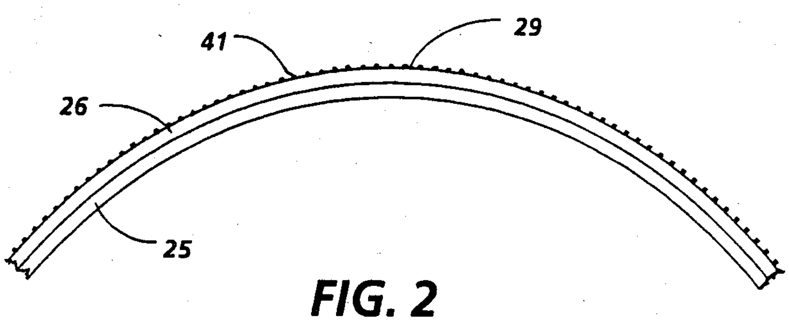
FIG. 2
FIG. 3
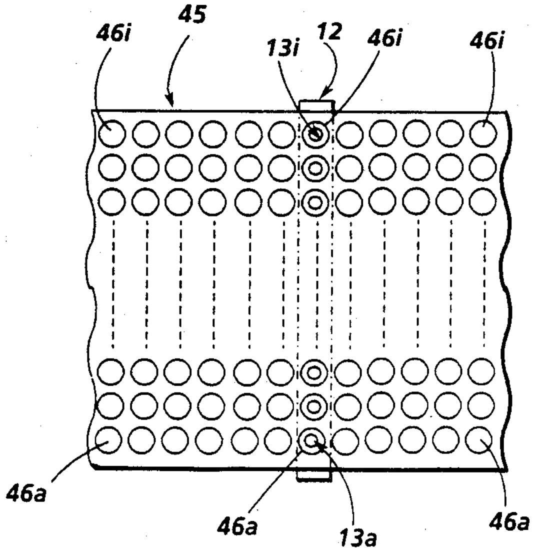

HOT MELT INK ACOUSTIC PRINTING

FIELD OF THE INVENTION

This invention relates to acoustic ink printing and, more particularly, to acoustic ink printing with hot melt inks.

BACKGROUND OF THE INVENTION

Acoustic ink printing is a promising direct marking technology because it does not require the nozzles or the small ejection orifices which have been a major cause of the reliability and pixel placement accuracy problems that conventional drop on demand and continuous stream ink jet printers have experienced.

It has been shown that acoustic ink printers have printheads comprising acoustically illuminated spherical focusing lenses can print precisely positioned picture elements (pixels) at resolutions which are sufficient for high quality printing of relatively complex images. See, for example, the copending and commonly assigned U.S. patent applications of Elrod et al, which were filed Dec. 19, 1986 under Ser. Nos. 944,490, 944,698, and 944,701 on "Microlenses for Acoustic Printing", "Acoustic Lens Arrays for Ink Printing" and "Sparse Arrays for Acoustic Printing", respectively. It also has been found that the size of the individual pixels that are printed by such a printer can be varied over a significant range during operation, thereby enabling the printer to impart, for example, a controlled shading to the printed image. See, another copending and commonly assigned U.S. patent application of Elrod et al, which was filed Dec. 19, 1986 under Ser. No. 944,286 on "Variable Spot Size Acoustic Printing".

Although acoustic lens-type droplet ejectors currently are favored, there are other types of droplet ejectors which may be utilized for acoustic ink printing, including (1) piezoelectric shell transducers, such as described in Lovelady et al U.S. Pat. No. 4,308,547, which issued Dec. 29, 1981 on a "Liquid Drop Emitter," and (2) interdigitated transducers (IDT's), such as described in copending and commonly assigned Quate et al U.S. patent application, which was filed Jan. 5, 1987 under Ser. No. 946,682 on "Nozzleless Liquid Droplet Ejectors" now U.S. Pat. No. 4,697,195 as a continuation of application Ser. No. 776,291 filed Sept. 16, 1985 (now abandoned). Furthermore, acoustic ink printing technology is compatible with various printhead configurations; including (1) single ejector embodiments for raster scan printing, (2) matrix configured arrays for matrix printing, and (3) several different types of pagewidth arrays, ranging from (i) single row, sparse arrays for hybrid forms of parallel/serial printing, to (ii) multiple row staggered arrays with individual ejectors for each of the pixel positions or addresses within a pagewidth address field (i. e., single ejector/pixel/line) for ordinary line printing.

For performing acoustic ink printing with any of the aforementioned droplet ejectors, each of the ejectors launches a converging acoustic beam into a pool of ink, with the angular convergence of the beam being selected so that it comes to focus at or near the free surface (i.e., the liquid/air interface) of the pool. Moreover, means are provided for modulating the radiation pressure which each beam exerts against the free surface of the ink. That permits the radiation pressure of each beam to make brief, controlled excursions to a sufficiently high pressure level to overcome the restraining force of surface tension, whereby individual droplets of ink are ejected from the free surface of the ink on command, with sufficient velocity to deposit them on a nearby recording medium.

Hot melt inks have the known advantages of being relatively clean and economical to handle while they are in a solid state and of being easy to liquefy in situ for the printing of high quality images. These advantages could prove to be of substantial value for acoustic ink printing, especially if provision is made for realizing them without significantly complicating the acoustic ink printing process or materially degrading the quality of the images that are printed.

SUMMARY OF THE INVENTION

In accordance with the present invention, to facilitate the use of hot melt inks in acoustic ink printers of the type having a printhead including one or more acoustic droplet ejectors for supplying focused acoustic beams, such a printer comprises a carrier for transporting a generally uniform thick film of hot melt ink across its printhead, together with a heating means for liquefying the ink as it nears the printhead. The droplet ejector or ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating.

BRIEF DESCRIPTION OF THE DRAWINGS

Still other features and advantages of this invention will become apparent when the following detailed description is read in conjunction with the attached drawings, in which:

FIG. 1 is a schematic elevational view of an acoustic ink printer having a hot melt ink coated carrier and a heating element for liquefying the ink as it nears a printhead;

FIG. 2 is a fragmentary elevational view of a mesh covered alternative to the carrier shown in FIG. 1;

FIG. 3 is a plan view of a hot melt ink coated carrier having a perforated layer overlying the ink.

DETAILED DESCRIPTION OF THE ILLUSTRATED EMBODIMENTS

Figure 4A:
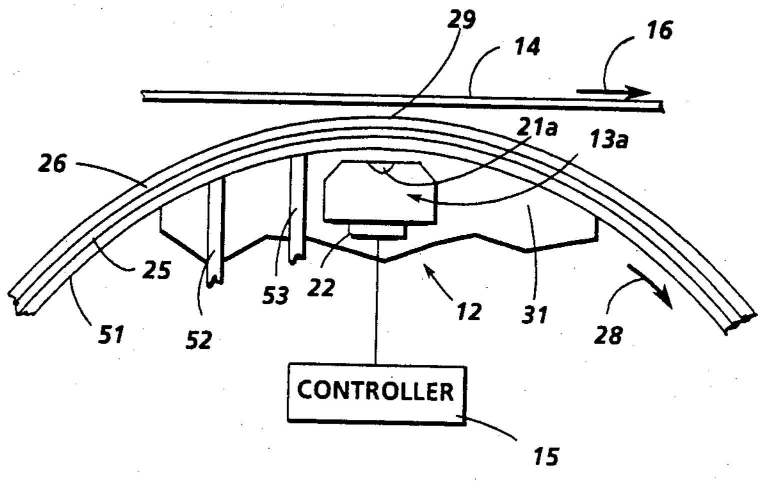
FIGS. 4A and 4B are end views of acoustic printheads having wiper contacts for passing an electrical current through a resistive undercoating on a hot melt ink carrier for liquefying the ink by localized electrical resistive heating.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Turning now to the drawings, and at this point especially to FIG. 1, there is an acoustic ink printer 11 comprising a printhead 12 having an array of droplet ejectors 13*a*–13*i* (only the near end ejector 13*a* can be seen in FIG. 1) for printing images on a suitable recording medium 14 in response to image data applied to a controller 15. For illustrative purposes, the printhead 12 is depicted as having a linear array of droplet ejectors 13*a*–13*i* (best shown in FIG. 3) for line printing. Thus, in this exemplary embodiment, the recording medium 14 is advanced during operation in a cross-line direction relative to the printhead 12, as indicated by the arrow 16. Nevertheless, it will be apparent that other printhead configurations could be employed, including some that would require an appropriately synchronized relative scan motion (not shown) between the printhead 12 and the recording medium 14 along an axis orthogonal to the arrow 16. Moreover, even though the line printer 11 is shown has having simple linear array of droplet ejectors 13*a*–13*i*, it may be preferable in practice to employ multiple row staggered arrays in some printers because staggered arrays permit increased center-to-center spacing of the ejectors.

As shown, the droplet ejectors 13*a*–13*i* have spherical focusing lenses 21*a*–21*i* (again, only the near end lens 21*a* can be seen) which are illuminated by acoustic waves generated by a piezoelectric transducer 22 which, in turn, is driven by the controller 15. Piezoelectric shell transducrs and IDT's (not shown) are available alternatives, so it is to be understood that the decision to use one type of droplet ejector rather than another may be influenced or even dictated by the specific configuration of the printhead 12, although the detailed criteria for making a well reasoned decision on that subject are beyond the scope of the present invention. Fortunately, at least with any of the known droplet ejectors, the controller 15 may perform the dual function of (1) controlling the ejection timing of the ejectors 13*a*–13*i* and of (2) modulating the size of the individual pixels that they print. See the aforementioned Elrod et al application, Ser. No. 944,286, which is hereby incorporated by reference Pixel size control, whether affected by modulating the size of the droplets that are ejected and/or by varying the number of droplets that are deposited per pixel,is useful for enhancing the perceived quality of some images, such as by imparting a controlled shading to them.

In accordance with the present invention, for delivering ink to the printhead 12, there is a web-like or belt-like carrier 25 which is overcoated with a generally uniformly thick film of hot melt ink 26. The carrier 25 and its hot melt ink overcoating 26 laterally extend across the full pagewidth of the printer 11. Furthermore, the carrier 25 is longitudinally advanced across a heating element 27 and then across the printhead 12 during operation (by means not shown),as indicated by the arrow 28, to continously present a relatively fresh supply of liquefied hot melt ink 26 to the printhead 12. The liquefied ink 26 is depleted as a result of having droplets being ejected from its free surface 29 to print an image on the recording medium 14, but the rate at which the carrier 25 is advanced across the printhead 12 is selected to be sufficiently high to maintain the working portion of the free surface 29 of the liquefied ink 26 (i. e., the portion that is aligned with the printhead 12 at any given point in time) essentially in the focal plane of the acoustic lenses 21*a*–21*i* (or, more generally stated, the output focal plane of the droplet ejectors 13*a*–13*i*) under even the most demanding operating conditions-viz., when droplets are being ejected at a peak rate. The ink 26 that remains on the carrier 25 gradually cools and resolidifies, so the used carrier 25 may be collected on the far side of the printhead 12 (by means not shown) for subsequent disposal, with minimal precautions being sufficient to reduce the soiling caused by the residual ink to acceptably low levels.

To carry out this invention, the heating element 27 is positioned just slightly ahead of the printhead 12 for liquefying the ink 26 as it nears the printhead 12. As shown in FIG. 1, the heating element 27 is located immediately beneath the ink coated carrier 25, but it will be evident that it could be located above the carrier 25 or even at an oblique angle with respect to it. The printhead 12, on the other hand, is acoustically coupled to the liquefied ink 26 via the carrier 25. Typically, the carrier 25 is a thin (e.g., 0.001 inch thick) flexible film formed from a polymer, such as mylar, polypropolene, or similar polyimides, or from a metal, such as nickel. Accordingly, the acoustic attenuation it causes is essentially negligible.

It, however, is recommended that provision be made for reducing the acoustic attentuation that occurs at the interface between the printhead 12 and the carrier 25. To that end, the printhead 12 advantageously is overcoated, as at 31, with a plastic having an intermediate acoustic velocity (i.e., an acoustic velocity between that of the printhead 12 and that of the ink 26). The outer surface of the overcoating 31 is relatively smooth, so it is well suited for use as a bearing surface for slidingly supporting the carrier 25 while it is passing over the printhead 12. A copending and commonly assigned Elrod et al U.S. patent application, which was filed Dec. 19, 1986 under Ser. No. 944,145 on "Planarized Printheads for Acoustic Printing" describes the composition and function of the printhead overcoating 31 in some additional detail. Nevertheless, it is noted that the coating 31 preferably has a generally arcuate crowned profile which causes the carrier 25 to wrap over it, thereby enhancing the mechanical contact that is achieved. Moreover, a thin film of water 32 or the like desireably is applied to the lower surface of the carrier 25, such as by a roller 33 which rotates in a water filled tank 34, to ensure that relatively efficient acoustic coupling is achieved, despite the minor mechanical irregularities that the printhead/carrier interface may exhibit.

Referring to FIG. 2, a relatively fine mesh screen 41 may be laminated or otherwise secured on top of the hot melt ink coated carrier 25 to inhibit particulate contaminants from falling into the ink 26. Similarly, as shown in FIG. 3, a perforated film 45 having a repetitive pattern of relatively large apertures, such as at 46*a*–46*i*, may bonded on top of the carrier 25. The apertures 46*a*–46*i* laterally align with the pixel positions or addresses on the recording medium 13 (FIG. 1) at which pixels are to be printed, and they extend through the film 45 so that the ink 26 for printing those pixels is exposed. Furthermore, the diameters of the apertures 46*a*–46*i* are significantly larger than the waist diameters of the focused acoustic beams supplied by the ejectors 13*a*–13*i*, whereby the sizes of the droplets of ink that are ejected via the apertures 46*a*–46*i* are determined by the ejectors 13*a*–13*i*, respectively, under the control of the controller 15 (FIG. 1). A separate aperture pattern is provided for the printing of each line of the image, so the layout of the aperture pattern is dependent on the specific configuration of the printhead 12 and its spatial repeat frequency is dependent on the line printing rate of the printer 11. One of the advantages of employing the perforated film 45 is that its outer surface may be coated with agent which inhibits the ink from wetting it (i.e., a hydrophobic material for water based inks or an oleophobic material for oil based inks), thereby further reducing the risk of persons, clothing or equipment being inadvertently stained by the ink 26.

Figure 4B:
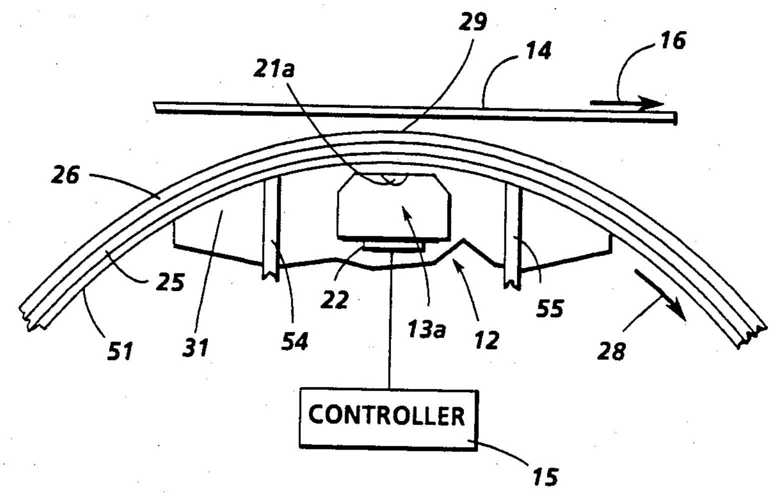

Turning to FIGS. 4A and 4B, it will be seen that the heating element 27 (FIG. 1) may supplemented by, or even completely eliminated in favor of, employing localized electrical resistive heating of the carrier 25 for liquefying the hot melt ink 26. To that end, in these embodiments, the lower surface of the carrier 25 is coated with a resistive metallization 51 which is slidingly engaged with a pair of longitudinally separated electrical wiper contacts 52 and 52 (FIG. 4A) or 54 and 55 (FIG. 4B). FIG. 4A shows that both of the contacts 52 and 53 may be located ahead of the printhead 12 for passing an electrical current through the segment of the metallization 51 that is between them at any given time, thereby resistively heating that segment to liquefy the hot melt ink 26 as it nears the printhead 12. FIG. 4B, on the other hand, shows that the same effect can be achieved by locating the contacts 54 and 55 on opposite sides of the printhead 12. If desired, the contacts 52 and 53 or 54 and 55 may be mechanically integrated with the printhead 12 to form a pre-aligned subassembly, such as by extending the printhead overcoating 31 to support them, or they may be independently supported (by means not shown).

Figure 5:
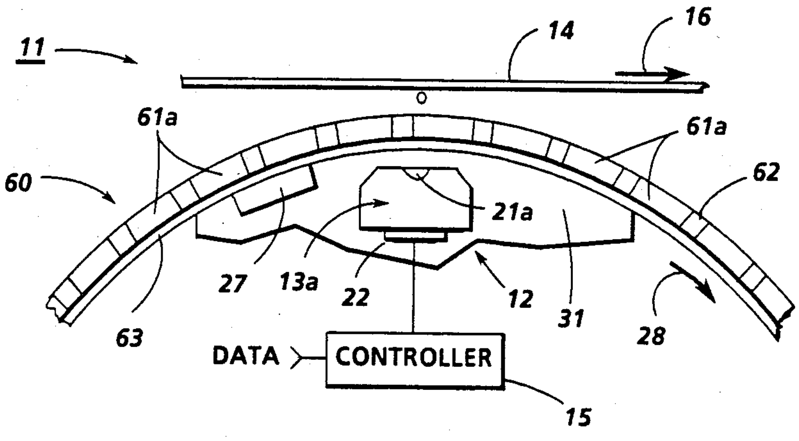
FIG. 5 is a fragmentary elevational view of a perforated carrier for hot melt ink

As illustrated in FIG. 5, there is a transport 60 in which hot melt ink 26 is carried in the apertures *61a–61i* (only the near side apertures *61a* can be seen) of a perforated carrier 62 for delivery to the printhead 12. The carrier 62 is similar in construction to the perforated film 46 of FIG. 3, with the only significant exception being that the hot melt ink 26 resides within the apertures *61a–61i*, rather than on a substrate layer, such as the carrier 25 of FIG. 3. A thin film solid substrate 63 advantageously is bonded to the carrier 62, but its function is prevent the hot melt ink, after it has been liquified, from contaminating the interface between the printhed 12 and the transport 60.

CONCLUSION

In view of the foregoing, it will now be understood that the present invention enables hot melt inks to be employed for acoustic ink printing, without significantly complicating the printing process or materially degrading the quality of the images that are printed. Relatively economical and reliable methods and means for accomplishing that have been disclosed, but others may suggest themselves to those who wish to take advantage of his invention.

What is claimed:

1. In an acoustic ink printer having a printhead including at least one ejector means for supplying an acoustic beam which converges to a focus approximately in a predetermined focal plane, the improvement compising a carrier means, which is coated with a generally uniformly thick layer of hot melt ink, for transporting said ink in a longitudinal direction across said printhead; said ejector means being acoustically coupled to said ink via said carrier means for ejecting individual droplets of ink therefrom on command; and heating means proximate said printhead; said heating means being thermally coupled to said ink ahead of said printhead for liquefying said ink as it approaches said printhead, whereby said ink presents a free liquid surface to said printhead;

the thickness of said hot melt ink layer and the rate at which it is transported across said printhead being selected so that said free surface remains essentially coplanar with said focal plane during operation.

2. The improvement of claim 1 wherein said heating means includes a heater, and said carrier means transports said hot melt ink past said heater and then across said printhead.

3. The improvement of claim 1 wherein said heating means includes an electrically resistive layer deposited on said carrier means, and a pair of spaced apart electrical wiper contacts engaged with said resistive layer for passing an electrical current therethrough, thereby causing localized electrical heating of said resistive layer for liquefying said ink.

4. The improvement of claim 3 wherein both of said contacts are located ahead of said printhead.

5. The improvement of claim 3 wherein said contacts are located on opposite sides of said printhead.

6. The improvement of any of claims 1–5 wherein said hot melt ink layer is partially covered by a protective outer layer which is bonded to said carrier means, whereby said protective layer inhibits contamination of said ink.

7. The improvement of claim 6 wherein said protective layer is a mesh screen.

8. The improvement of claim 6 wherein said protective layer is a film having a longitudinally repetitive pattern of relatively large diameter apertures extending through it on centers selected to laterally align the apertures within each repeat of said pattern with respective pixel positions within a pagewidth image field, and said individual droplets of ink have finite diameters which are determined essentially independently of the diameters of said apertures.

9. The improvement of claim 8 wherein said film has a ink repellant exterior surface for inhibiting said ink from wetting it.

10. In an acoustic ink printer having a printhead including at least one ejector means for supplying an acoustic beam which converges to a focus approximately in a predetermined focal plane such that said acoustic beam has a relatively narrow waist diameter in said focal plane, the improvement compising a carrier having a longitudinally repetitive pattern of relatively large diameter apertures extending through it on centers selected to laterally align the apertures within each repeat of said pattern with respective pixel positions within a pagewidth image field, each of said apertures containing a supply of hot melt ink of predetermined thickness, said carrier being advanced during operation in a longitudinal direction for transporting said ink across said printhead, and heating means thermally coupled to said ink ahead of said printhead for liquefying said ink as it approaches said printhead;

said ejector means being acoustically coupled to said ink as it reaches said printhead for ejecting individual droplets of ink from a free surface thereof on command, and the thickness of the hot melt ink contained in said apertures and the rate at which the ink is transported across said printhead being selected to maintain the free surface of said ink essentially in said focal plane during operation.

* * * * *